(12) United States Patent
Boyd et al.

(10) Patent No.: US 12,359,732 B2
(45) Date of Patent: Jul. 15, 2025

(54) METHODS AND SYSTEMS ASSOCIATED WITH A HIGH-PRESSURE PLUG

(71) Applicant: Commando Pressure Control Inc., Houston, TX (US)

(72) Inventors: Joseph Boyd, Katy, TX (US); David Tyroch, Houston, TX (US)

(73) Assignee: Commando Pressure Control, Inc., Houston, TX (US)

( * ) Notice: Subject to any disclaimer, the term of this patent is extended or adjusted under 35 U.S.C. 154(b) by 0 days.

(21) Appl. No.: 18/244,442

(22) Filed: Sep. 11, 2023

(65) Prior Publication Data

US 2024/0093789 A1  Mar. 21, 2024

Related U.S. Application Data

(60) Provisional application No. 63/407,973, filed on Sep. 19, 2022.

(51) Int. Cl.
*F16K 5/18* (2006.01)
*F16K 5/04* (2006.01)

(52) U.S. Cl.
CPC ............ *F16K 5/184* (2013.01); *F16K 5/0407* (2013.01); *F16K 5/0478* (2013.01); *F16K 5/188* (2013.01)

(58) Field of Classification Search
CPC .......... F16K 5/184; F16K 5/188; F16K 5/225; F16K 5/222; Y10T 137/4442
See application file for complete search history.

(56) References Cited

U.S. PATENT DOCUMENTS

| | | | | |
|---|---|---|---|---|
| 2,299,517 | A * | 10/1942 | Volpin | F16K 5/188 137/246.12 |
| 2,746,712 | A * | 5/1956 | Wickman | F16K 5/188 251/109 |
| 2,774,363 | A * | 12/1956 | Benzien | F16K 5/162 134/22.12 |
| 3,042,359 | A * | 7/1962 | Bredtschneider | F16K 1/42 251/309 |
| 3,183,925 | A * | 5/1965 | Hoyle | F16K 5/222 137/246.22 |
| 4,116,208 | A * | 9/1978 | Smith | F16K 5/222 137/246.22 |
| 4,506,696 | A * | 3/1985 | von Pechmann | F16K 5/182 251/312 |
| 6,675,825 | B1 * | 1/2004 | Reeves | F16K 5/225 137/246.22 |

* cited by examiner

*Primary Examiner* — Kevin F Murphy
(74) *Attorney, Agent, or Firm* — Pierson IP, PLLC (57) ABSTRACT

A bi-directional floating plug that utilizes pressure from fracturing, wirelines, etc. to set a metal-to-metal seal against a fixed insert within a valve body, and a secondary seal via a energized fluid within a sealing groove while the metal-to-metal seal is retained.

1 Claim, 8 Drawing Sheets

METHODS AND SYSTEMS ASSOCIATED WITH A HIGH-PRESSURE PLUG

BACKGROUND INFORMATION

Field of the Disclosure

Examples of the present disclosure relate to methods and systems associated with high pressure plugs for the energy sector. Specifically, embodiments are directed towards bi-directional floating plugs that utilize pressure from fracturing, wirelines, etc. to set a metal to metal seal against a fixed insert within a valve body and fluids within a grooved sealing surface to form a secondary seal.

Background

High pressure valves utilize a metal-to-metal sealing mechanisms between the surface of a barrier, such as a gate or plug, and an adjacent surface, such as a seat or insert. High pressure valves commonly use a floating barrier design that allows the barrier to be positioned between the sealing surface of the seat on both sides. When no force is applied, a floating barrier should reside equidistant inside the valve body and between the seats without contacting any adjacent sealing feature. When forces are applied to the surface area of the barrier, the sealing surfaces of the barrier and the seat are in contact, and to engage the metal-to-metal seal.

However, relying solely on the metal-to-metal sealing mechanism in high pressure valve is unreliable and troublesome for several reasons. Namely, changing tolerances of the elements of the high pressure valve creates inconsistence performance, environmental impacts and debris influence the elements of the high pressure valve, and upstream forces cause the barrier to move, which exposes the valve body to sand and chemicals. Over time, particles of sand can scratch, corrode, etc. the metal sealing surfaces, which compromise the valve's ability to reliably seal.

Accordingly, needs exist for systems and methods for a high pressure floating plug that is configured to allow for bi-directional metal to metal seals against fixed inserts within a valve body, wherein sealing grooves positioned on sealing surfaces of the plug are configured to receive pressurized fluids to form a secondary seal against the fixed insert and grease the sealing surfaces of the plug and the insert.

SUMMARY

Embodiments described herein disclose a high pressure plug for the energy sector. The plugs may be free floating ball valves that are configured to form seals against an insert positioned within a valve body, wherein the valve body may within a fracturing manifold, fracturing stack, choke manifold, fracturing valve, etc. The plug may be configured to rotate between an open position and a closed position. In the open position a passageway through the plug may be exposed and extend in parallel to a flow path. In the closed position, the passageway may extend in a direction orthogonal to the flow path, and a first or second sealing surface may be positioned adjacent to a face of an insert to form a seal. The plug may include the passageway, first sealing surface, second sealing surface, and at least one grease flow path.

The passageway may be an opening extending through the plug that allows fluid to flow through the plug when the plug is open and aligned with openings through inserts. In other words, the passageway is an opening spanning the plug, allowing fluid to flow through it when the plug aligns with openings in the inserts and restrict the flow of fluid when misaligned. The passageway has a first face on a first side of the plug and a second face on a second side of the plug, and a hollow chamber from the first face to the second face. Fluid may be configured to be communicated through the hollow chamber when the plug is in an open position, wherein when in the open position the hollow chamber may be aligned with a central axis of the valve. When the plug is in the closed position, the hollow chamber may be orthogonal to the central axis of the valve. This may restrict the flow of fluid through the passageway, and thus the valve system.

The first sealing surface and the second sealing surface may be positioned between the first face and the second face on opposite sides of the plug, wherein the first sealing surface and the second sealing surface may be positioned one hundred eighty degrees apart from each other. In embodiments, responsive to positioning the plug in the closed position, the plug may be floating and not creating a seal. However, after applying an upstream force against the second sealing surface, the first sealing surface may be positioned directly adjacent to, and contacting, a first insert, causing a metal to metal seal, wherein the second insert is positioned upstream from the first insert. In other words, a force applied to the downstream side of the plug in an upstream direction may push the plug upstream to create a direct metal to metal seal on the upstream insert.

Responsive to positioning the plug in the closed position and applying a downstream force against the second sealing surface, the first sealing surface may be positioned adjacent to the second insert causing a metal to metal seal, wherein the second insert is positioned downstream from the first insert. In other words, a downstream force applied to the upstream side of the plug may push the plug downstream to create a direct metal to metal seal on the downstream insert.

The first and second sealing surfaces may include a first sealing groove and a second sealing groove, respectively. These grooves interconnect with grease flow paths, featuring inlets on the plug's face and conduits extending into the sealing grooves. This intricate design enables the introduction of pressurized grease, forming a secondary seal on either the upstream or downstream insert, depending on the sealing surface's position. More specifically, the sealing grooves may extend along an outer perimeter of the corresponding sealing surface forming the metal to metal seal with the insert. The sealing grooves on the first and/or second sealing surfaces may be communicatively coupled to at least one grease flow path. The grease flow path may have an inlet on a face of the plug, and may have conduits that extend perpendicularly from the inlet into the first and second sealing grooves. The inlet on the face of the plug may be configured to transfer grease or other fluids into the sealing grooves under pressure to create a secondary seal on the upstream or downstream insert. Specifically, if a downstream sealing surface is positioned adjacent to the downstream insert, then the sealing groove around the circumference of the downstream sealing surface may create a secondary seal on the downstream insert. Alternatively, if an upstream sealing surface is positioned adjacent to the upstream insert, then the sealing groove around the circumference of the upstream sealing surface may create a secondary seal on the upstream insert.

Responsive to flowing grease from the inlet, the grease may flow into the first and second sealing grooves under pressure. The groove may be energized via the injected grease around the perimeter of the metal to metal sealing surface to less than, equal to or greater than the psi applied in the direction to form the seal. This allows an operator to control a degree of engagement of the secondary seal based on the pressure of the energized grease within the sealing groove. Furthermore, the secondary seal may limit debris, sand, etc. from contacting the metal to metal seal between the first sealing surface and the insert during the fracturing operation. This may enable greasing of the valve without stopping the fracturing process or changing the fracturing composition of the fracturing fluid directly interacting with the plug to form the seal. The energized grease pressure within the sealing grooves, combined with the applied hydraulic pressure, orchestrates the plug's contact with the corresponding insert, creating the metal-to-metal seal which is followed by the energizing the grease forming the secondary seal. This synergy minimizes tolerance issues, amplifying valve performance, longevity, reliability, and reducing maintenance-related expenses.

To this end, embodiments of the plug may assist with metal to metal sealing mechanisms by adding grease psi force to an encompassing sealing groove within the metal to metal sealing surface forming the seal, wherein the metal to metal a self-sustaining system that does not require human interaction during frac ops.

The energized grease within the sealing groove and applied frac psi that forces the plug to contact a corresponding insert to create the metal seal reduces the variance and tolerance issues in the valve and its respective internal parts. This increases valve performance, lifespan, reliability, reduces risks and failures, reduces replacing parts which reduces repairs back to the customer, reduces strain on supply chain due to less parts required for replacement/repairs, and reduces capex for valves and valve components due to the increase in asset utilization.

Embodiments may include a machined, circular grooved on an outer perimeter of the sealing surfaced of the plug face. This sealing groove and greasing system may increase durability/reliability, prolong the lifespan of the valve, allowing its components and surpass the quality of service of its competitors. In embodiments, the grease within the sealing groove within the sealing surface may be under pressure to maintain secondary seal.

In embodiments, when the plug is initially in the closed position both of the inserts may be floating and not in contact with the sealing surface of the plug. The valve is considered floating until energy in the form of psi is applied to the upstream surface or downstream of the closed valve. The initial contact energy between the sealing components, plug and inserts, comes from the psi being applied upstream or downstream of the surface that will be creating the metal to metal seal. The secondary seal can be energized around the perimeter of the metal to metal sealing surface to less than, equal to or greater than the psi being applied from the upstream force upstream.

The geometric design of the sealing grooves that encompasses the sealing portions of the plug body creates the secondary barriers. These secondary seals provide added benefits, in addition to, a secondary seal working symbiotically to the metal to metal seal. When upstream psi is introduced, if the valve is in the closed position, the plug will be contacted by the force of the frac fluid, causing the plug to shift to towards the downstream insert until the plug stops. In the closed position, grease is introduced into the sealing groove by a pump. The pressurized grease is then retained in this sealing groove for the entirety of the stage and can be energized further as needed to accommodate psi fluctuations during the frac operations in which the valve is closed and isolating psi.

Due to the sealing grooves on both sealing surfaces of the plug, grease may seep out the downstream sealing surface of the plug, coating the surface of the metal to metal seal providing a protective barrier against debris and chemicals that would otherwise compromise the integrity of the metal to metal sealing surface. The upstream side of the plug that was contacted by the psi force, subsequently has its metal to metal sealing surface protected as well by introduced grease in the sealing groove. The grease that is energized in the sealing groove around that sealing face of the plug keeps sand, contaminants, chemicals and acid from entering the metal to metal sealing area of the valve body. At the end of a stage when the frac psi is reduced, the plug returns to its initial floating position between the upstream and downstream inserts, and a small gap is created on the downstream side of the plug between the plug and its adjacent insert.

The grease psi residing in the sealing grooves, on both sides of the plug, bleeds out from the sealing grooves without human or mechanical intervention through this gap, coating the surface of the metal to metal seal. Again, this protects and prolongs the lifespan of the plug, inserts and internals of the valve itself by adding lubrication to its critical components.

This system is not susceptible to the same pitfalls as our competitors as we are not simply replacing a natural metal to metal seal with a hydraulically energized metal to metal seal. Embodiments, utilize the psi from frac ops to create the initial metal to metal seal, and in addition we are creating a secondary seal with pressurized grease and/or fluids within the sealing groove.

Embodiments protect the metal to metal sealing surfaces with grease continuously in a zero-psi environment, while the sealing surface of the prior art can only be greased between stages and only during certain operating circumstances. Embodiments are able to grease our plug valve at any point during frac ops, without the need to interrupt other wellsite operations.

Specific embodiments may utilize bi-directional plugs that can hold psi on either upstream or downstream side of the plug when in the closed position as the situation dictates via energized grease or fluids. Other embodiments may include a single directional plug that is configured to only hold back psi on a single side via energized grease or fluids. Accordingly, this patent introduces groundbreaking high-pressure plug embodiments that harness hydraulic and pressurized grease forces to achieve enhanced sealing, durability, and operational efficiency within the energy sector.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
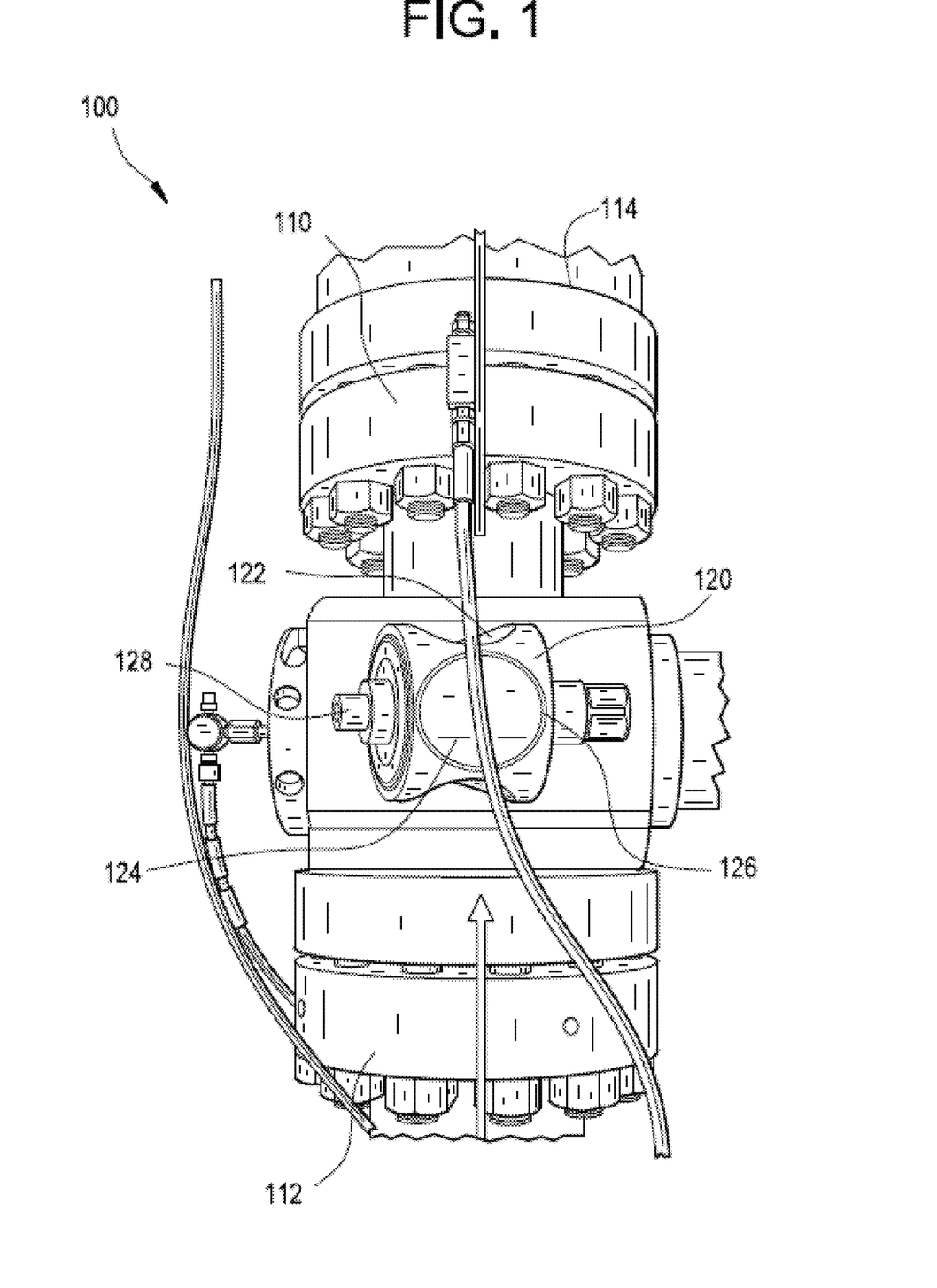
FIG. 1 depicts a high pressure valve system, according to an embodiment.

This patent presents innovative embodiments of a high-pressure plug designed for applications within the energy sector. The disclosed plugs, functioning as free-floating ball valves, are meticulously engineered to establish secure seals against an insert positioned within a valve body. These valve bodies are commonly found within equipment like fracturing manifolds, fracturing stacks, choke manifolds, and fracturing valves. The plug's design enables it to smoothly transition between an open and a closed position. When open, the plug unveils a passageway that aligns parallel to the flow path. In the closed position, the passageway reorients perpendicular to the flow path, and one of two sealing surfaces tightly engages the insert's face to create a first seal while pressurized grease creates a second seal. FIG. 1 depicts a high pressure valve system, according to an embodiment. High pressure valve 100 may include a valve body 110 and plug 120.

Valve body 110 may be a device that is configured to regulate, direct, or control the flow of fluid, gases, slurries, etc. through a hollow passageway extending from a proximal end 112 of valve body 110 to a distal end 114 of valve body 110. Valve body 110 may be configured to allow bi-directional flow of fluid through the hollow passageway, wherein fluid may flow downstream from proximal end 112 to distal end 114 or upstream from distal end 114 to distal end 112. In embodiments, fluid may freely flow between proximal end 112 and distal end 114 when plug 120 is in the open position, and the flow of fluid may be restricted when plug 120 is in the closed position.

Plug 120 may be a device that is positioned within valve body 110, and may be configured to selectively control the flow of the fluids, gases, slurries, etc. moving through the hollow passageway. Plug 120 may include a through bore 122 with a first opening and a second opening. When an axis extending through the first opening and the second opening of through bore 122 is aligned with an axis extending through the hollow passageway of valve body 110 then fluids, gases, slurries, etc. may flow through plug 120. When the axis extending through the inlet and the outlet of through bore 122 is positioned orthogonal with the axis extending through the hollow passageway of valve body 110 then fluids, gases, slurries, etc. may not flow through plug 120. Plug 120 may be a floating plug that is configured to move downstream or upstream based on forces applied to plug 120 via fluid flowing in the hollow passageway through valve body 110. Specifically, responsive to an upstream surface of plug 120 receiving forces in a downstream direction, a downstream sealing surface of plug 120 may contact a downstream insert to form a metal to metal seal with the insert. Responsive to a downstream surface of plug 120 receiving forces in an upstream direction, an upstream sealing surface of plug 120 may contact an upstream insert to form a metal to metal seal. Accordingly, plug 120 may selectively rotate to be in in an open position to allow fluids to flow through valve body 110, and rotate to be in a closed position to restrict the flow of fluids through valve body 110.

When plug 120 is in the closed position, a first sealing surface 124 may face the hollow passageway of valve body 110. When the plug 120 is initially in the closed position, neither the upstream nor the downstream sealing surface may contact a corresponding insert or portion of valve body 110. This may enable plug 120 to be floating. Responsive to energy in the form of PSI being applied to an upstream or downstream of a closed valve, contact on the opposite sealing components, i.e. the sealing surface and insert, may form a metal to metal seal. These metal to metal seals may form a first seal between the plug and the inserts.

First sealing surface 124 may be configured to form a metal to metal seal with an insert of valve body 110 to seal the hollow passageway through valve body. First sealing surface 124 may include a sealing groove 126.

Sealing groove 126 may be configured to be positioned along an outer perimeter of the metal to metal seal, and receive fluid, such as grease, from grease port 128. Grease port 128 may be positioned into a face of plug 120, and communicate pressurized or energized grease or other fluids into sealing groove 126. The energized grease may form a secondary seal on the metal insert, and allow the grease to coat surfaces of the insert and plug 120 after the metal to metal seal is released. This may enable a primary seal and a secondary seal between the plug and the inert to be maintained simultaneously, wherein the metal to metal seal is the primary seal and the energized fluid forms the secondary seal. Furthermore, the energized grease within sealing groove 126 may limit debris, sand, etc. from contacting the metal to metal sealing surfaces during the fracturing operation.

Figure 2:
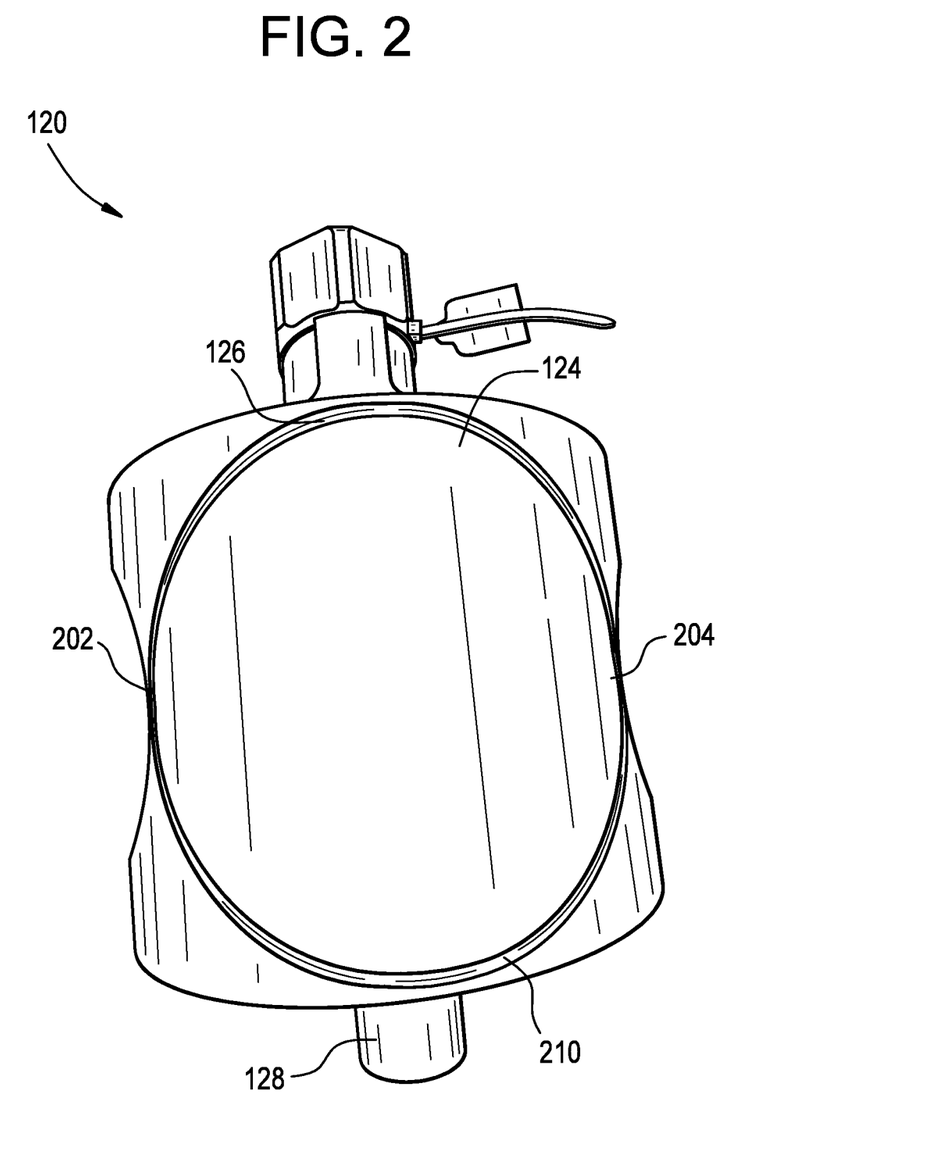
FIG. 2 depicts a plug, according to an embodiment.

FIG. 2 depicts plug 120, according to an embodiment. Elements depicted in FIG. 2 may be described above, and for the sake of brevity a further description of these elements may be omitted.

As described above, a hollow passageway may extend from first opening 202 to second opening 204. Based on the flow of fluid through the hollow passageway and the rotational positioning of plug 120 first opening 202 may be an inlet or an outlet, and the second opening 204 may be an outlet or an inlet. First sealing surface 124 may be positioned radially between first opening 202 and second opening 204 on an outer circumference of plug 120, wherein a second sealing surface (not shown) may be positioned on an opposite radial side of plug 120. First sealing surface 124 and the second sealing surface may be symmetrical in shape and size. First sealing surface 124 may be configured to create a metal to metal seal on a fixed insert within valve body 110 during a fracturing operation.

Positioned on an outer perimeter of first sealing surface 124 may be first sealing groove 126. First sealing groove 126 may be circular, oval, rounded, etc. in shape, and may be shaped and sized to maximize an area within first sealing groove 126. First sealing groove 126 may include an outlet 210 of a grease conduit, wherein the grease conduit may from grease inlet 128 to outlet 210. Outlet 210 may be positioned proximate to inlet 128, which may limit a length of travel for grease through inlet 128 to outlet 210. Responsive to flowing grease or fluid from the inlet 128 into first sealing groove 126, the grease or fluid may flow into the first sealing groove 126 under pressure. First sealing groove 126 may be energized via the injected grease or fluid around the perimeter of the metal to metal sealing surface at a pressure less than, equal to or greater than the psi applied through the valve body 110 in the direction to form the seal. This allows an operator to control a degree of engagement of a secondary seal formed via the grease within first sealing groove 126 based on the pressure of the energized grease or fluid within first sealing groove 126. Additionally, the energized grease or fluid may flow into the second sealing groove on the second sealing surface, which is positioned away from the opposite insert.

In embodiments, if a downstream sealing surface is positioned adjacent to a downstream insert, then first sealing groove 126 around the circumference of the downstream sealing surface may create a secondary seal on the downstream insert that is configured to assist the primary metal to metal seal. Additionally, the second sealing groove and the upstream sealing surface may be positioned away from the upstream insert.

Alternatively, if an upstream sealing surface is positioned adjacent to the upstream insert, then second sealing groove around the circumference of the upstream sealing surface may create a secondary seal on the upstream insert. Additionally, the first sealing groove and the downstream sealing surface may be positioned away from the downstream insert.

To this end, the grease or fluid under pressure may be configured to simultaneously apply grease or fluid to the upstream insert, downstream insert, upstream sealing surface, and the downstream sealing surface during a fracturing operation. The subsequent bleeding of pressure of the plug to return the plug to the floating position may allow the grease or fluid in the upstream and downstream sealing grooves to coat the corresponding surfaces of the plug and the insert without further user intervention or pumping additional fluids after the fracturing procedure.

Figure 3:
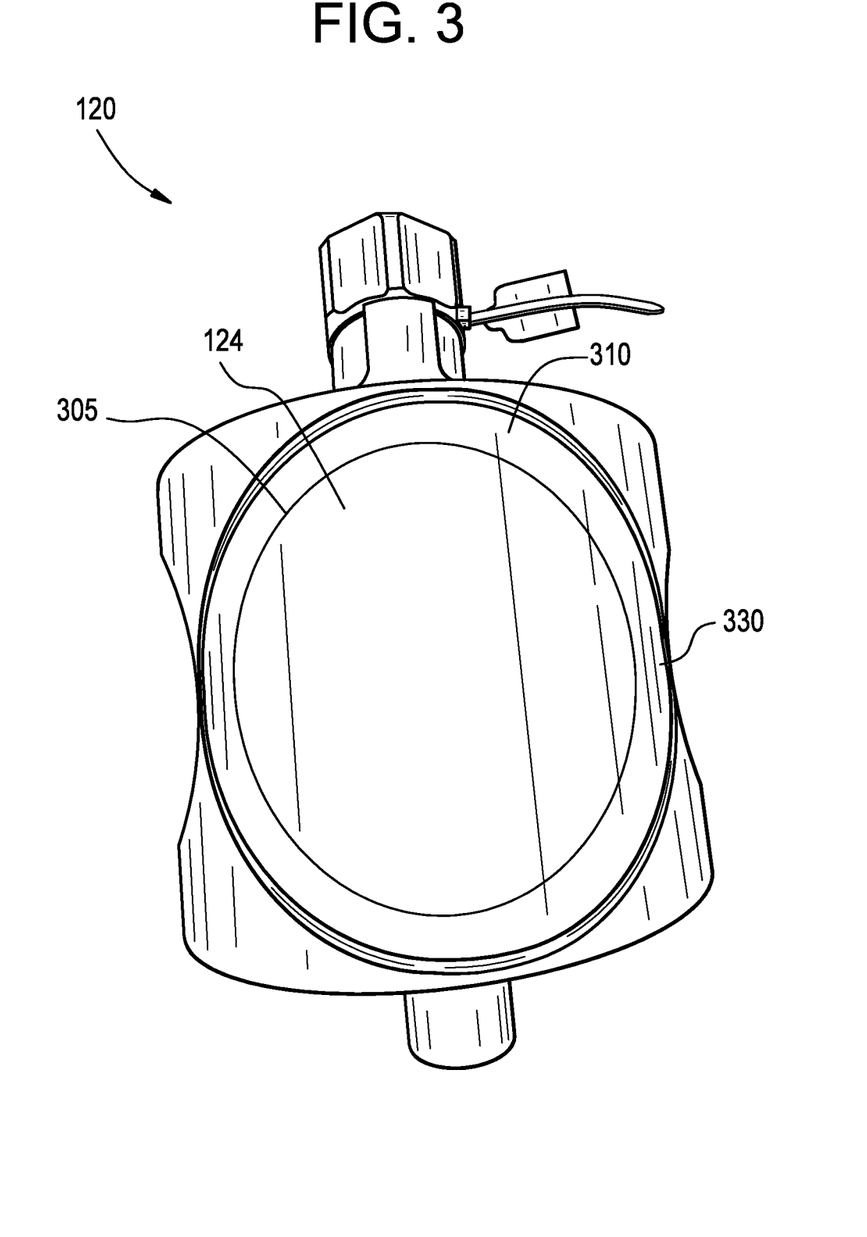
FIG. 3 depicts a plug, according to an embodiment.

FIG. 3 depicts plug 120 according to an embodiment. Elements depicted in FIG. 3 may be described above, and for the sake of brevity a further description of these elements may be omitted.

In embodiments, when the first sealing surface 124 is exposed to the hollow passageway extending through the valve body 110 and an insert, a first portion 330 of first sealing surface 124 may be exposed to the hollow passageway. A second portion 310 of first sealing surface 124 may form a metal to metal seal against an insert. Positioned directly on the perimeter of the metal to metal seal, and the perimeter of the second portion 310, may be the first sealing groove 126, which forms a secondary seal against the insert. In embodiments, a surface area of second portion 310 may be smaller than that of first portion 330, wherein an outer perimeter 305 of first portion 330 is an inner perimeter of second portion 310.

In embodiments, due to the insert having an opening, first portion 330 of first sealing surface 124 may be configured to directly interact with and receive forces from the fluid flowing against plug 120. This may cause the sealing surface, positioned one hundred eight degrees from first sealing surface 124 to be positioned against an insert, which may form a metal to metal seal.

Figure 4:
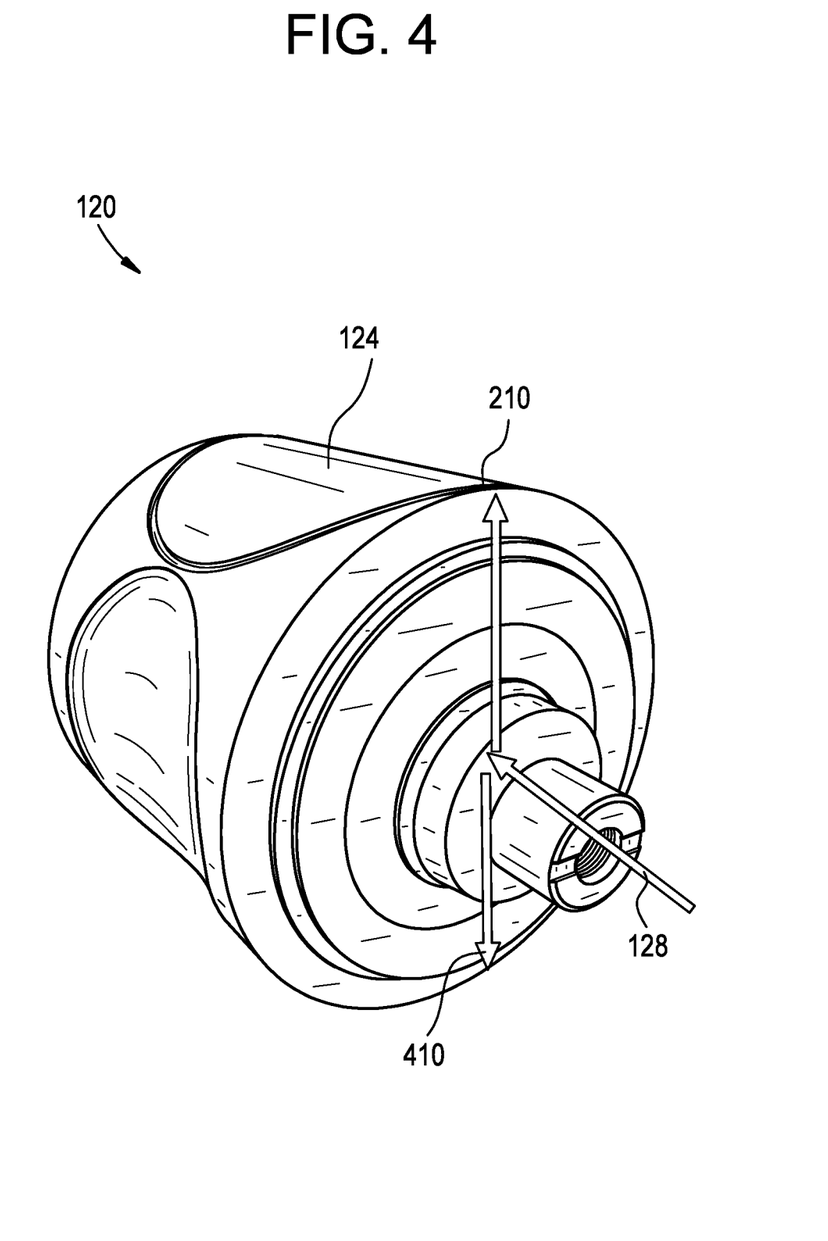
FIG. 4 depicts a plug, according to an embodiment.

FIG. 4 depicts plug 120, according to an embodiment. Elements depicted in FIG. 4 may be described above, and for the sake of brevity a further description of these elements may be omitted.

As depicted in FIG. 4, grease inlet 128 may be configured to simultaneously transfer grease, or other fluids or gases, into sealing grooves 210, 410 on opposite sides of plug 120. This may allow grease to be positioned on both an upstream and downstream sealing surfaces and inserts, which may occur when fluid is flowing through a valve body in the upstream or downstream position. By having multiple sealing grooves 210, 410 on opposite sides of plug 120 a fluid lock may not be created when the pressurized grease within a first sealing groove 210 forms a secondary seal due to second sealing groove 410 being positioned away from an insert.

However, in other embodiments, only a first sealing surface 124 may include a grease outlet 210.

Figure 5:
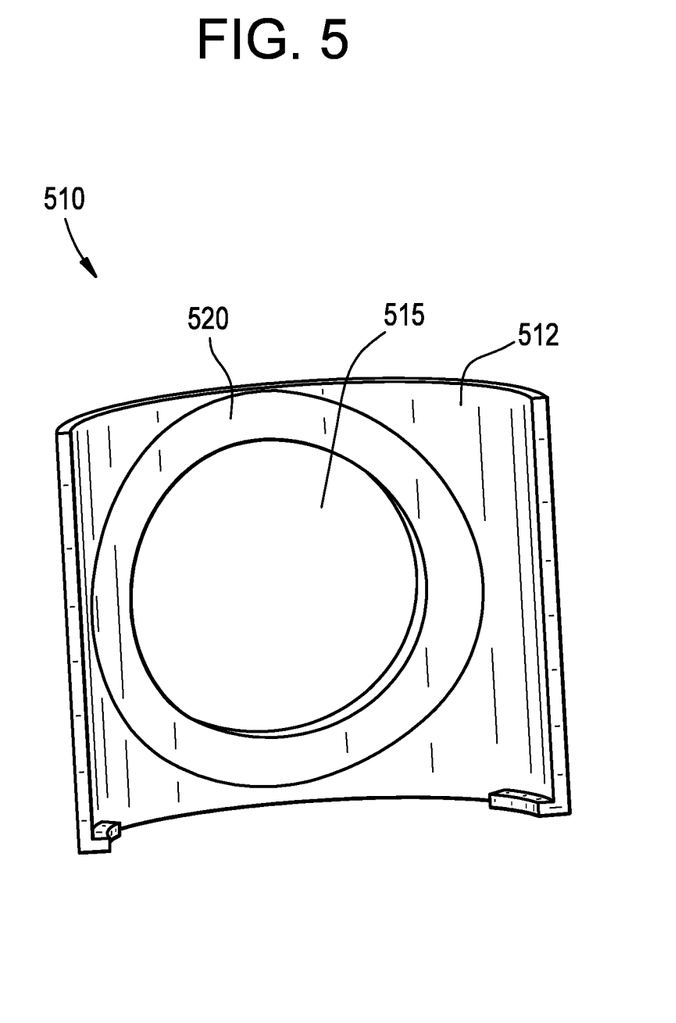
FIG. 5 depicts an insert, according to an embodiment.

FIG. 5 depicts an insert 510, according to an embodiment. Elements depicted in FIG. 5 may be described above, and for the sake of brevity a further description of these elements may be omitted.

In embodiments, a first insert 510 may be positioned upstream from plug 120, and a second insert may be positioned downstream from plug 120. The first insert 510 and second insert may be symmetrical in shape and size, and be static. The first insert 510 and second insert may be configured to form a tubular housing to house plug 120. First insert 510 may include a body 512 and passageway 515.

Body 512 may be a housing, casing, etc. that is configured to encompass plug 120. Body 512 may be configured to be semi-circular in shape, and have edges that are positioned adjacent to the body of a second insert 510.

Through body 512 may be a passageway 515. Passageway 515 may be configured to be permanently aligned with the through bore of the valve body. When plug 120 is in the open position, passageway 515 may be exposed to the bore of plug 120. When plug 120 is in the closed position, passageway 515 of the first insert 510 may not be in communication with the passageway of the second insert 510 due to the first sealing surface and/or second sealing surface of plug 120.

Seal 520 may be positioned directly adjacent to passageway 515. When plug 120 is in the closed position, seal 520 may be configured to be positioned over the sealing groove and the second portion of first sealing surface. This may allow seal 520 to form a metal to metal seal with the second portion of the first sealing surface, while also receive forces from the grease within the sealing groove to form a secondary seal.

Figure 6:
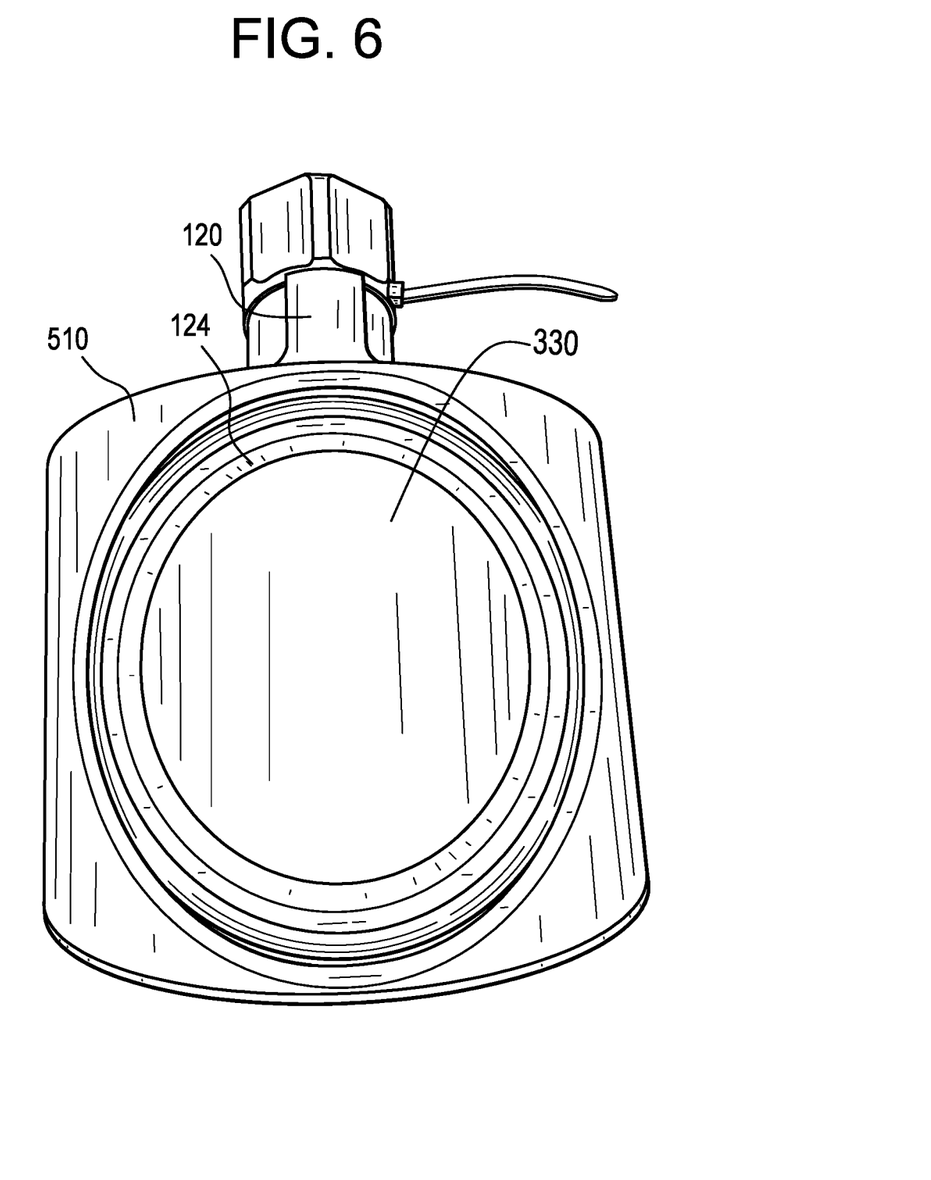
FIG. 6 depicts a plug positioned within first insert, according to an embodiment.

FIG. 6 depicts plug 120 positioned within first insert 510, according to an embodiment. Elements depicted in FIG. 6 may be described above, and for the sake of brevity a further description of these elements may be omitted.

When plug 120 is in the closed position, as depicted in FIG. 6, passageway 515 may be sealed via first sealing surface 124 while second portion 330 of first sealing surface 124 is exposed to the through bore of the valve body.

Figure 7:
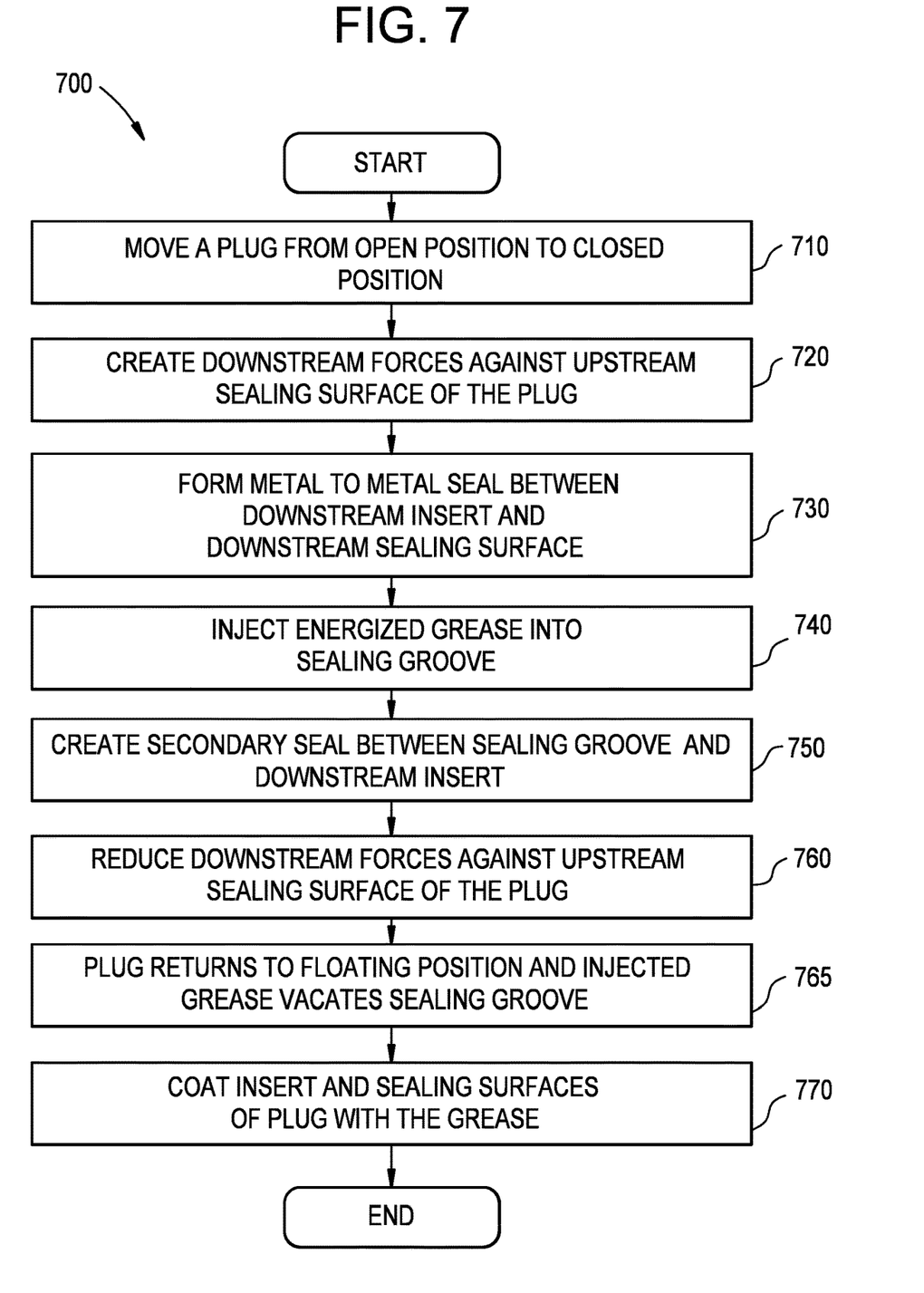
FIG. 7 depicts a method for a high pressure valve system, according to an embodiment.

FIG. 7 depicts a method 700 for a high pressure valve system, according to an embodiment. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

At operation 710, a plug may be rotated within a valve body from an open position to a closed position. When the plug is in the open position, fluids may be communicated across the plug through a passageway in the plug. When the plug is in the closed position, fluids may be restricted from flowing across the plug. Furthermore, when the plug is in the closed position, both an upstream insert and a downstream insert may not be contacting the plug.

At operation 720, forces may be created against an upstream sealing surface of the plug via PSI created from fluids flowing downstream against the plug.

At operation 730, the forces against the upstream sealing surface may move the plug to create a metal to metal seal between the downstream sealing surface of the plug and a downstream insert. In embodiments, the forces against the upstream sealing forces may be caused by fracturing fluids.

At operation 740, grease, or other fluids, may be injected into a first sealing groove on the downstream sealing surface and a second sealing groove on the upstream sealing surface. The first sealing groove may be positioned on an outer perimeter of the metal to metal seal between the downstream insert and the downstream sealing surface.

At operation 750, the grease may be injected into the groove at a sufficient PSI to create a secondary seal between the energized grease and the insert. This may allow greasing during a fracturing operation.

At operation 760, the forces applied against the upstream sealing surface of the plug may be reduced, and the injection PSI of the grease may be reduced. This may cause the plug to move, and no longer form a seal against the downstream insert while being in the closed position. Furthermore, the bleeding down of injection PSI of the grease may allow for a self-sustain greasing supply for the valve parts without additional greasing operations.

At operation 770, while the plug is in the closed position, grease within the first sealing groove and the second sealing groove may seep out of the first sealing groove to coat surfaces of the downstream insert, upstream insert, downstream sealing surface, and/or the upstream sealing surface.

The grease that is energized in the sealing groove around that sealing surface of the plug keeps sand, contaminants, chemicals and acid from entering the metal to metal sealing area of the valve body. At the end of a stage when the frac psi is reduced, the plug may return to its initial floating position and a small gap is created on the downstream side of the plug between the plug and its adjacent insert. The grease residing in the sealing groove on both sides of the plug, bleeds out from the sealing groove without human or mechanical intervention through this gap, coating the surfaces of the metal to metal seal. Again, this protects and prolongs the lifespan of the plug, inserts and internals of the valve itself by adding lubrication to its critical components.

In other words, activated grease in the sealing groove effectively shields the metal-to-metal sealing region of the valve body from sand, contaminants, chemicals, and acid while simultaneously forming a pressurized seal. As a fracturing stage concludes and the fracturing PSI subsides, the plug returns to its initial floating state, forming a minor gap between the plug and its adjacent insert on the downstream side. The grease in the sealing groove, present on both sides of the plug, gradually emanates from the groove through this gap, coating the surfaces of the metal-to-metal seal. Once again, this protective measure enhances the longevity and performance of the plug, inserts, and internal components by supplying essential lubrication.

Figure 8:
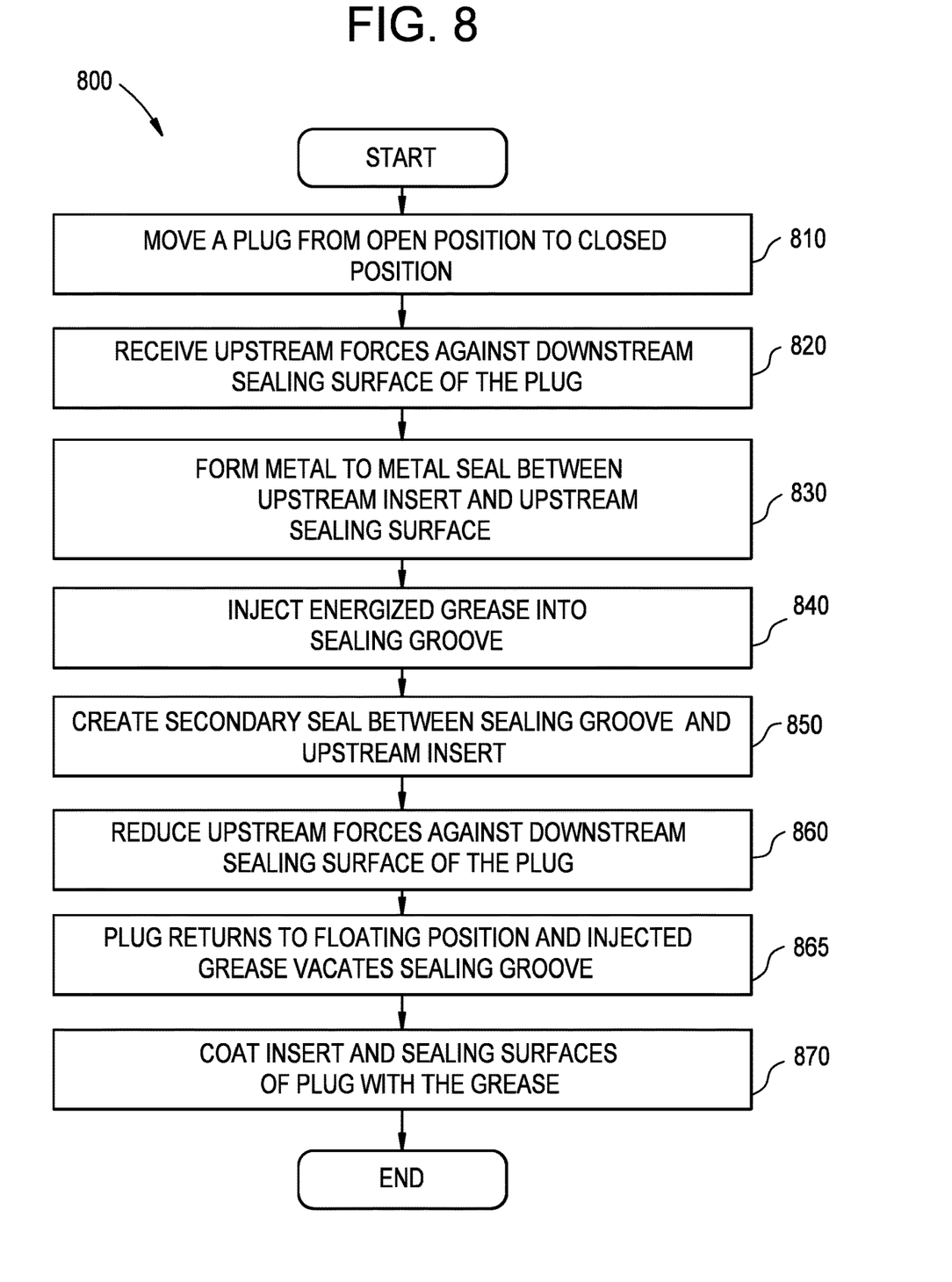
FIG. 8 depicts a method for a high pressure valve system, according to an embodiment.

FIG. 8 depicts a method 800 for a high pressure valve system, according to an embodiment. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

At operation 810, a plug may be rotated within a valve body from an open position to a closed position. When the plug is in the open position, fluids may be communicated across the plug through a passageway in the plug. When the plug is in the closed position, fluids may be restricted from flowing across the plug.

At operation 820, forces may be created against a downstream sealing surface of the plug via PSI created from fluids flowing upstream against the plug.

At operation 830, the upstream forces against the downstream sealing surface may move the plug to create a metal to metal seal between the upstream sealing surface of the plug and a upstream insert.

At operation 840, grease, or other fluids, may be injected into a second sealing groove on the upstream sealing surface and a first sealing groove on the downstream sealing surface. The second sealing groove may be positioned on an outer perimeter of the metal to metal seal between the upstream insert and the upstream sealing surface.

At operation 850, the grease may be injected into the groove at a sufficient PSI to create a secondary seal between the energized grease and the insert.

At operation 860, the forces applied against the downstream sealing surface of the plug may be reduced, and the injection PSI of the grease may be reduced. This may cause the plug to move, and no longer form a seal against the upstream insert while being in the closed position.

At operation 870, while the plug is in the closed position, grease within the first sealing groove and the second sealing groove may seep out of the first sealing groove to coat surfaces of the downstream insert, upstream insert, downstream sealing surface, and/or the upstream sealing surface.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method associated with a high pressure valve assembly, the method comprising:

moving a floating plug from an open position and a closed position, the floating plug having a bore extending through, a hollow passageway extending from a passageway inlet to a passageway outlet, the floating plug including a first sealing surface positioned circumferentially between the passageway inlet and the passageway outlet on an outer circumference of the plug;

forming a primary seal by positioning the first sealing surface against an insert based on a first pressure being applied against the floating plug in a first direction during a fracturing operation, the fracturing operations causing fluctuations in the first pressure being applied to the floating plug in the first direction,     communicating energized fluid into a first sealing groove via a port during the fracturing operation, the first sealing groove being positioned along an outer circumference of the first sealing surface, wherein a groove circumference of the first sealing groove is larger than the outer circumference of the first sealing surface;

forming a secondary seal formed between the first sealing groove and the insert via the energized fluid within the first sealing groove, the energized fluid forming the secondary seal having a pressure larger than the first pressure;

maintaining the secondary seal during the fracturing operation;

dynamically controlling the pressure associated with the energized fluid based on the fluctuations of pressures applied to the plug in the first direction during the fracturing operation.

* * * * *